United States Patent [19]

Rose

[11] Patent Number: 4,562,990
[45] Date of Patent: Jan. 7, 1986

[54] DIE VENTING APPARATUS IN MOLDING OF THERMOSET PLASTIC COMPOUNDS

[76] Inventor: Robert H. Rose, 13850 Forest Groove Rd., Brookfield, Wis. 53005

[21] Appl. No.: 501,645

[22] Filed: Jun. 6, 1983

[51] Int. Cl.[4] .............................................. B29C 1/14
[52] U.S. Cl. ..................................... 249/141; 249/67; 264/102; 264/334; 425/556; 425/812
[58] Field of Search ............... 425/420, 812, 543, 544, 425/444, 554, 546, 577; 249/141, 67; 264/102, 334, 339

[56] References Cited

U.S. PATENT DOCUMENTS

| | | | |
|---|---|---|---|
| 2,178,774 | 11/1939 | Bogoslowsky | 154/17 |
| 2,410,510 | 11/1946 | Lester | 425/543 |
| 2,976,571 | 3/1961 | Moslo | 249/141 |
| 2,987,772 | 6/1961 | Beatty | 249/141 |
| 3,108,339 | 10/1963 | Bucy | 425/812 |
| 3,266,099 | 8/1966 | Bucy | 249/141 |
| 3,349,833 | 10/1967 | Hodler | 425/812 |
| 3,377,662 | 4/1968 | Fukushima | 425/191 |
| 3,810,599 | 5/1974 | Fornari | 249/67 |
| 3,822,857 | 7/1974 | Tanie | 249/141 |
| 3,893,644 | 7/1975 | Drazick | 425/444 |
| 3,903,956 | 9/1975 | Pekrol | 249/67 |
| 3,914,086 | 10/1975 | Hujik | 425/444 |
| 4,126,291 | 11/1978 | Gilbert | 249/63 |
| 4,140,470 | 2/1979 | Pasch | 425/544 |
| 4,359,443 | 11/1982 | Michaels | 264/328.2 |
| 4,431,047 | 2/1984 | Takeshima et al. | 425/420 |
| 4,489,771 | 12/1984 | Takeshima et al. | 425/420 |

FOREIGN PATENT DOCUMENTS 575323  7/1946  United Kingdom ............... 425/543

Primary Examiner—Jay H. Woo
Assistant Examiner—J. Fortenberry
Attorney, Agent, or Firm—Robert T. Johnson

[57] ABSTRACT

In molding of plastic materials, particularly thermoset compounds, venting of dies is essential to obtain well molded parts, and this invention discloses improved venting of dies in molding of thermoset plastic compounds wherein a vent path 4 vents from the die into a vent well 3, said vent well comprises a wedge shape having a transition angle of 10° to 35° and a vent extension 6 extending from said vent well 3, to the atmosphere.

6 Claims, 3 Drawing Figures

DIE VENTING APPARATUS IN MOLDING OF THERMOSET PLASTIC COMPOUNDS

SUMMARY OF THE INVENTION

When dies for molding of thermoset plastic are not adequately vented, the resultant moldings are marked by inadequate fill of the die, and may have so-called burned spots, and indications of so-called short fill due to gas entrapment.

An object of this invention is to disclose die venting means to insure adequate fill of the die.

Another object of this invention is to disclose die venting means comprising a vent well outside of the molding die.

Another object of this invention is to disclose die venting means, comprising a vent well outside of the die and connected thereto by a vent path to fill said vent well, and means comprising a knock out pin to eject the material in said vent well.

Another object of this invention is venting of dies in molding of thermoset plastic compounds, comprising a vent path and vent well connected thereto, said vent well comprising a wedge shape, and a transition angle of 10° to 30° going into said wedge shape, a knock out pin in contact with said wedge shape, and vent extension from said wedge to atmosphere.

Another object of this invention is to disclose venting of a die in molding of thermoset plastic compounds, comprising a vent well outside of the die, said vent well connected to said die by means of a vent path.

Another object of this invention is to disclose venting of a die in molding of thermoset plastic compounds, comprising a die, die vent and a vent well connected thereto by means of said vent and vent extension from said vent well and means to eject cured compound from said vent well.

INFORMATION DISCLOSURE OF RELEVANT ART

Relevant art considered pertaining to this present invention is as follows.

U.S. Pat. No. 2,178,744—Method of Making a Golf Ball—This patent discloses straight vents opposite the fill gate of the molding, which vents are merely straight holes to vent the air out of the die during fill of the die with the thermoplastic material, then plugs are inserted into the vents to develop more pressure in the die. This would not be usable in molding of thermoset compound.

U.S. Pat. No. 3,377,662—Metal Mold Having Vent Plug Means For Shaping a Plastic Article And Vulcanizing a Rubber Article. This patent discloses a vent means comprising a cylinder and a removal plug with grooves thereon. This patent then does not touch this present application.

U.S. Pat. No. 3,822,857—Synthetic Resin Plug for Vent Hole of Mold. This patent covers plugs with micro holes for die venting. This present Rose invention does not involve such as is disclosed in this patent.

U.S. Pat. No. 4,126,291—Injection Mold For Elongated Hollow Articles. This patent pertains to molding of elongated hollow articles and vents in a manner comprising spiral flats ground on vent pin.

U.S. Pat. No. 4,140,470—Transfer Molding Venting System. "Venting" of this patent concerns a filter means to allow flow of gases but not elastomeric materials being molded. This does not concern the present Rose invention.

U.S. Pat. No. 4,359,443—Venting Arrangement For Matched Molds And Method. The venting of this patent involves a gasket between the mold halves with vents being tubes through the gasket.

This present invention of Rose does not involve a gasket between the mold halves or tubes to serve as vents.

In transfer or injection molding of thermoset compounds, the dies are usually vented opposite the gate through which plasticized compound is fed into the die. There are instances, however, where the vent is not opposite the gate due to geometry of the part or location of the gate. Often the gate location is determined by filling or shooting material into the die and on locating the gas mark knit line or pocket, the vent is then made in the die at this location.

It has been determined that this invention solves the problems of inadequate die venting, yet allows full densification of material forced into the die.

DESCRIPTION OF INVENTION

Figure 1:
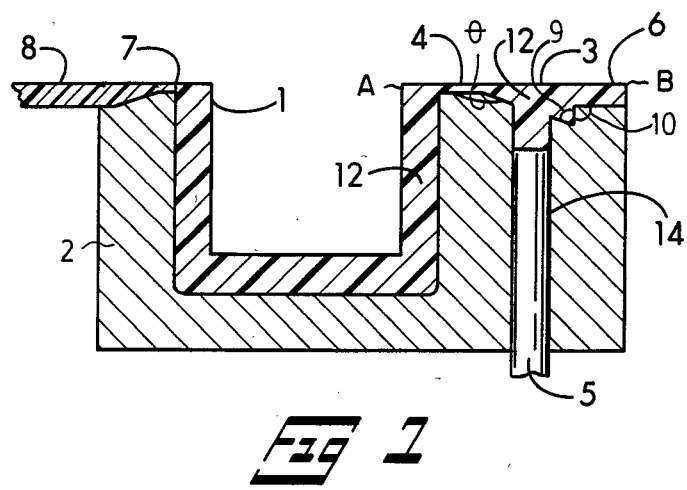
FIG. 1—Elevation View
1—Molding
2—Die cavity
3—Vent well
4—Vent path
5—Knock out pin
6—Vent extension
7—Gate
8—Runner
12—Cured compound
14—Knock out pin hole
$\theta$ Obtuse angle
A-B—Top surface of compound in vent.
Figure 3:
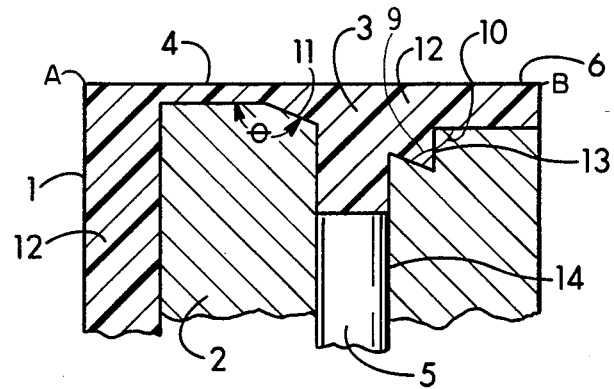
FIG. 3—Enlarged Elevation View of Vent Construction
1—Molding
2—Die Cavity
3—Vent well
4—Vent path
5—Knock out pin
6—Vent extension
9—Vent well angle at bottom about 60°.
10—Vent well angle at top 90°
11—Transition angle of vent path to vent well about 30°.
12—Cured compound
13—Vent well wall
14—Knock out pin hole
$\theta$ Obtuse angle
A-B—Top surface of compound in vent.

Referring now to the drawings, FIGS. 1 and 3, the cured compound 12 of molding 1, is shown in die cavity 2. Vent path 4, vent well 3, and vent extension 6, exhausting to the atmosphere, all contain cured compound 12.

Knock out pin 5 pushes cured compound out of vent well 3 when molding 1 is ejected from the die.

Figure 2:
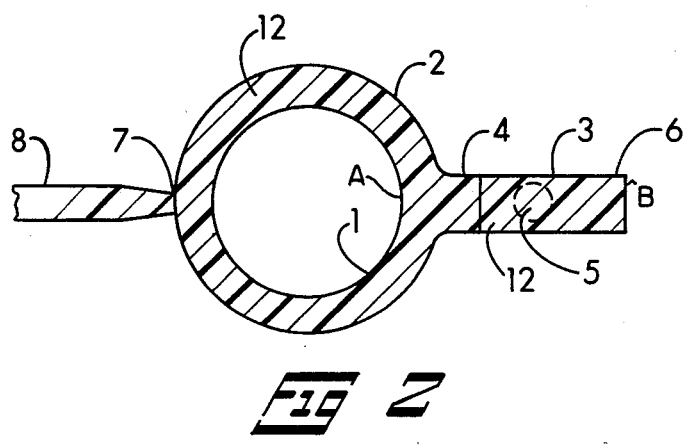
FIG. 2—Plan View
1—Molding
2—Die cavity
3—Vent well
4—Vent path
5—Knock out pin location
6—Vent extension
7—Gate
8—Runner
12—Cured compound
A-B—Top surface of compound in vent.

For illustration vent path 4 is located opposite gate 7, connected to runner 8, as shown in FIG. 2. In FIG. 2, knock out pin 5 location is shown.

The vent well 3 construction comprises a wedge of triangular shape in elevation, FIGS. 1 & 3, wherein bottom vent well angle 9 is of about 60°, vent well angle 10 is 90° and, transition angle 11 of vent path to vent well is about 30°. As angle 11 varies, so will angle 9.

$\theta$ is an obtuse angle, which when subtracted from 180° gives the acute or transition angle of vent path to vent well angle 11.

Vent wall 13 is vertical and is to be parallel to the long axis of knock out pin 5.

An example of vent dimension is as follows:

Assuming the weight of the molding to be 100 gms, vent path 4 of about 0.0127 mm thick by about 2.38 mm long, from die well to transition angle 11 of vent path 4 to vent well 3. The width of said vent path 4 and vent well 3 and vent extension 6 is about 4.76 mm maximum. The depth of vent well 3 is 4.76 mm and vent extension 6, at about 0.051 mm in thickness, and about 4.76 mm wide. The transition angle 11 is 30°, and $\theta$ angle is 150°.

The angle $\theta$ is 150°, then 180° minus 150° gives a transition angle 11 of 30°.

The transition angle 11 may vary depending on amount of material and type of material being forced into the die. This transition angle of between 10° to 35°, and preferably not over 30° is to be determined by trail of molding as those acquainted with the art of molding will readily realize.

Removal of the vented compound from the vent well, vent path and vent extension, by action of the knock out pin 5 always insures an open vent on each fill cycle of the die.

This invention is based on the wedge shape of the vent well 3 and vent extension 6, exhausting to the atmosphere. The transition angle 11, of vent path to vent well can vary from 10° to 35°, with the preferred angle to be less than 35° preferably not over 30°.

The transition angle 11 referred to above means the angle at which the wedge shape drops off of horizontal to form the above mentioned wedge, or it can be considered the angle at which the wedge shape varies from the plane of the die land area. To express the angle in a different way, the angle $\theta$ is 180° minus the transition angle or 180° minus $\theta$ is the transition angle.

The "die land area" is, in molding of plastics, on a plane known as "seal off" surface on mating of the die male and female sections, and as shown in the drawing FIG. 3, the die land area is on a horizontal plane, and the angle at which the wedge shape drops off of the horizontal is the transition angle.

It is to be pointed out that vent top A-B is to extend straight out from the die 2 so that knock out 5 on being activated, forces material out of the vent well 3.

In FIGS. 1 and 2, note that the cavity 2 is on the knock out side of vent well 3, however the invention is not limited to this configuration as the knock out pin 5 of the vent well 3 could just as easily be mounted on the male or punch side of the cavity 2 as those acquainted with the molding art would be well aware.

The knock out pin 5 as shown in FIGS. 1 & 3, has a flat top which makes contact with the cured compound 12 extending from vent well 3 into knock out pin hole 14.

For clarity in the description of this invention, only the vent arrangement is shown. The punch or male section of the die is not shown as this is well known in the art.

Having described my invention for "Improved Venting Of Dies In Molding Of Thermoset Plastic Compounds", I claim:

1. Die venting apparatus in molding of thermoset plastic compounds, comprising a vent well outside of a die, said vent well connected to said die by means of a vent path.

2. Die venting apparatus in molding of thermoset plastic compounds, comprising a die, die vent path, a vent well connected thereto by means of said die vent path, a vent extension from said vent well and means to eject cured compound from said vent well.

3. Venting of dies in molding of thermoset plastic compounds of claim 2, wherein means to eject material from the vent well consists of a knock out pin.

4. Die venting apparatus of claim 2 wherein said vent well comprises a wedge shape having a transition angle of 10° to 30° from said vent path.

5. Die venting apparatus of claim 2 wherein said vent well comprises a wedge shape having a transition angle of 30° from said vent path.

6. Die venting apparatus in molding of thermoset plastic compounds consisting of a die vent path, a wedge shape, and a transition angle of 10° to 30° going into said wedge shape from said die vent path, a knock out pin contact with said wedge shape, and vent extension from said wedge shape to atmosphere.

* * * * *